Aug. 13, 1935.　　　G. E. ROWE　　　2,011,187
APPARATUS FOR FORMING HOLLOW GLASS ARTICLES
Filed May 18, 1933　　　6 Sheets-Sheet 1

Witness:
A. A. Horn

Inventor:
George E. Rowe
by Brown & Cashman
Attorneys.

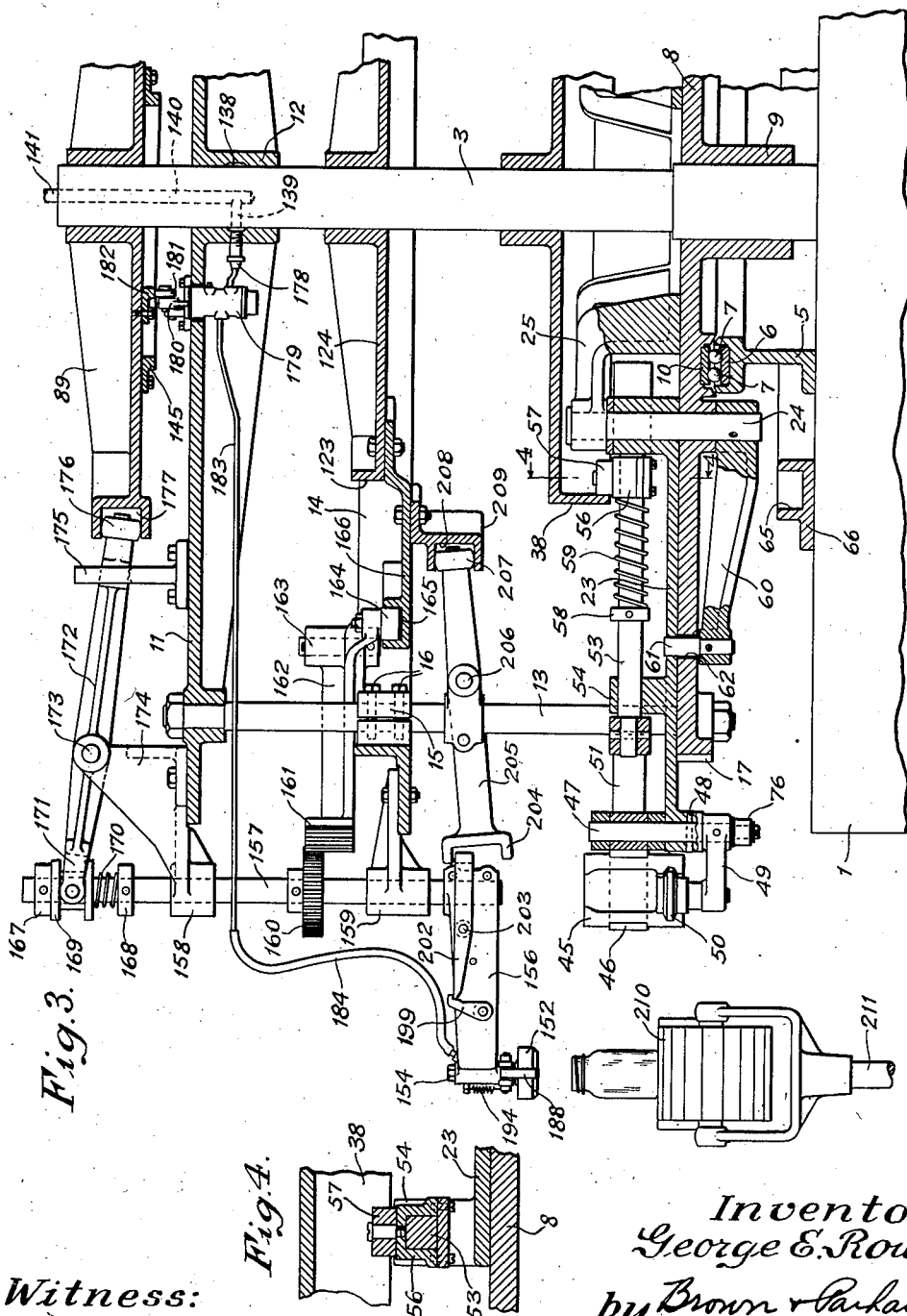

Aug. 13, 1935.  G. E. ROWE  2,011,187
APPARATUS FOR FORMING HOLLOW GLASS ARTICLES
Filed May 18, 1933  6 Sheets-Sheet 4

Witness:
A. A. Horn

Inventor:
George E. Rowe
by Brown & Parham
Attorneys.

Aug. 13, 1935.  G. E. ROWE  2,011,187
APPARATUS FOR FORMING HOLLOW GLASS ARTICLES
Filed May 18, 1933  6 Sheets-Sheet 5
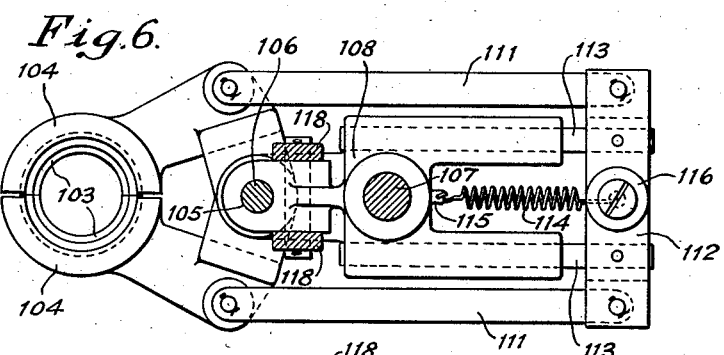
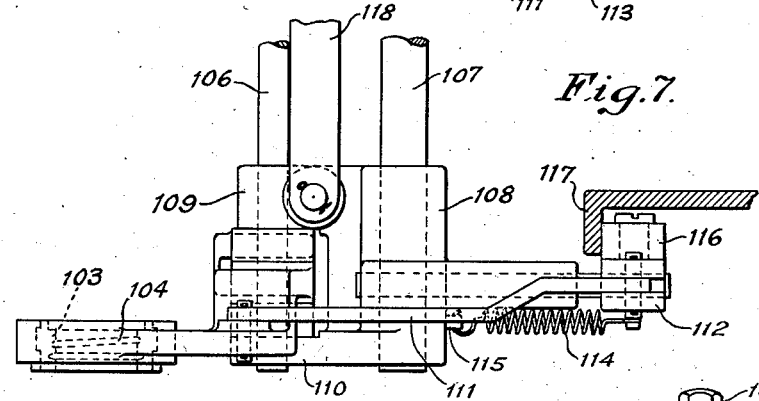
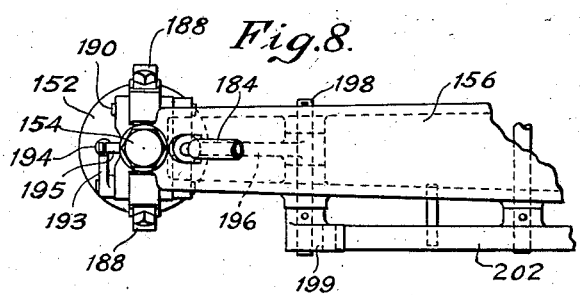
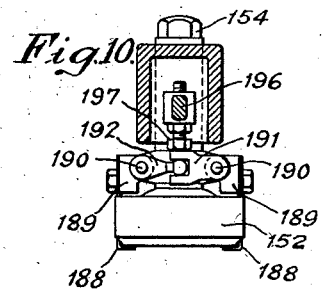
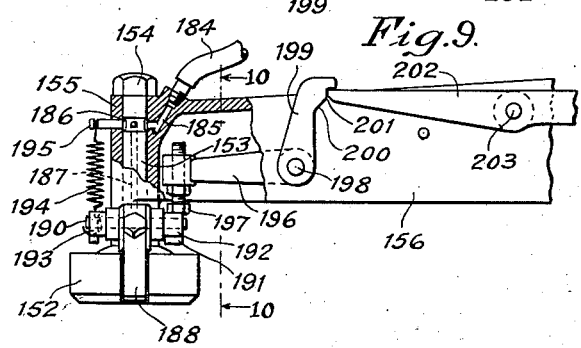
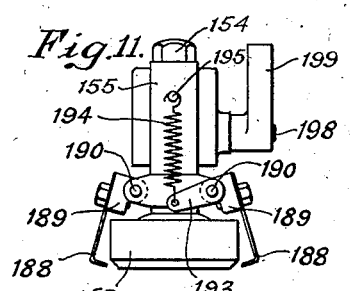
Inventor:
George E. Rowe
by Brown & Parham
Attorneys.
Witness:
A. A. Horn

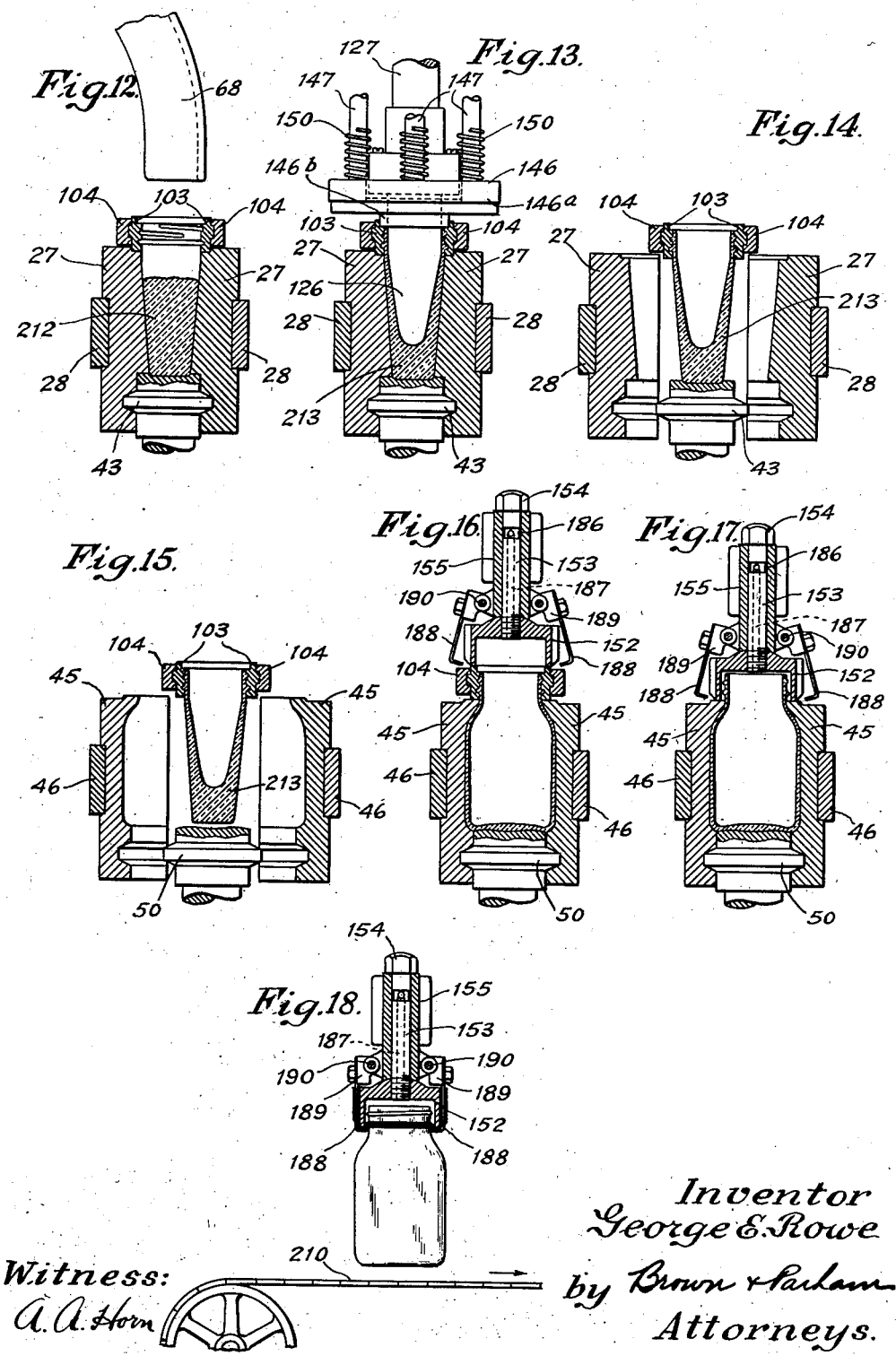

Patented Aug. 13, 1935

2,011,187

UNITED STATES PATENT OFFICE 2,011,187

APPARATUS FOR FORMING HOLLOW GLASS ARTICLES

George E. Rowe, Wethersfield, Conn., assignor to Hartford-Empire Company, Hartford, Conn., a corporation of Delaware Application May 18, 1933, Serial No. 671,610

7 Claims. (Cl. 49—9)

This invention relates to apparatus for forming hollow glass articles and more particularly to apparatus usable for rapidly forming articles of the pressed and blown type by what is now known as an "overlapping cycle".

A machine for forming glass articles by an "overlapping cycle", that is in which final blowing of one article in a final blow mold overlaps in point of time the supplying of a second charge of glass to the corresponding blank mold, is disclosed in the patent to Ingle, No. 1,843,160, granted February 2, 1932. The disclosure of that patent is of a stationary unit machine. In view of the general popularity of rotary machines, especially of the single turret type, the present invention includes the provision of an overlapping cycle in a single turret rotary machine, and more particularly the provision of new and improved apparatus for carrying out the bottle forming process using this type of cycle, with the accompanying advantages of high speed of article formation in terms of articles per mold per minute and at the same time the production of high quality ware, due in some measure at least to the ability to maintain the molds at sufficiently high temperatures so that they will operate efficiently in the extraction of heat from the glass.

Among the objects of the invention is to provide in a machine of the single turret rotary type for a series of blow heads equal in number to that of the blow molds provided, wherein each blow head co-operates successively with two adjacent blow molds, and thus each blow mold is supplied successively during the formation of each article with blowing pressure by two adjacent blow heads, the blow heads being mounted on and rotating with the turret, so that the application of blowing pressure is not limited to periods of dwell of the turret, if such periods are provided.

A further object of the invention is to provide for the removal of completed articles formed on a continuously rotating turret by a combined blow head and tongs mechanism mounted on the turret and adapted to place these articles upon a continuously moving conveyor moving in a straight horizontal path adjacent to the turret and in which there is provision for causing the speed of the tongs mechanism to approximate that of the delivery conveyor during the placing of articles thereon, this action to take place during movement of the blow head between two molds with which it is adapted alternately to cooperate.

A further object of the invention is to provide in a machine of the character described a simplified means for opening and closing the blank and blow molds.

Further and more specific objects of the invention will become apparent from the following description and appended claims when taken in connection with the accompanying drawings, in which:

Fig. 3 is a view similar to Fig. 2, but taken at a different angle of the machine to illustrate the removal of completed articles and certain of the operating mechanisms;

Fig. 4 is a fragmentary view in vertical section on the line 4—4 of Fig. 3;

Fig. 6 is a view principally in plan and partly in horizontal section showing the neck ring and certain associated operating mechanism;

Fig. 7 is a detail view principally in elevation of the structure shown in Fig. 6;

Fig. 8 is a fragmentary view in plan of the end of the arm carrying the combined blow head and take-out mechanism;

Fig. 9 is a view principally in elevation, but with parts broken away and in vertical section, illustrating the structure shown in Fig. 8;

Fig. 10 is a view in vertical section on the line 10—10 of Fig. 9;

Figure 1:
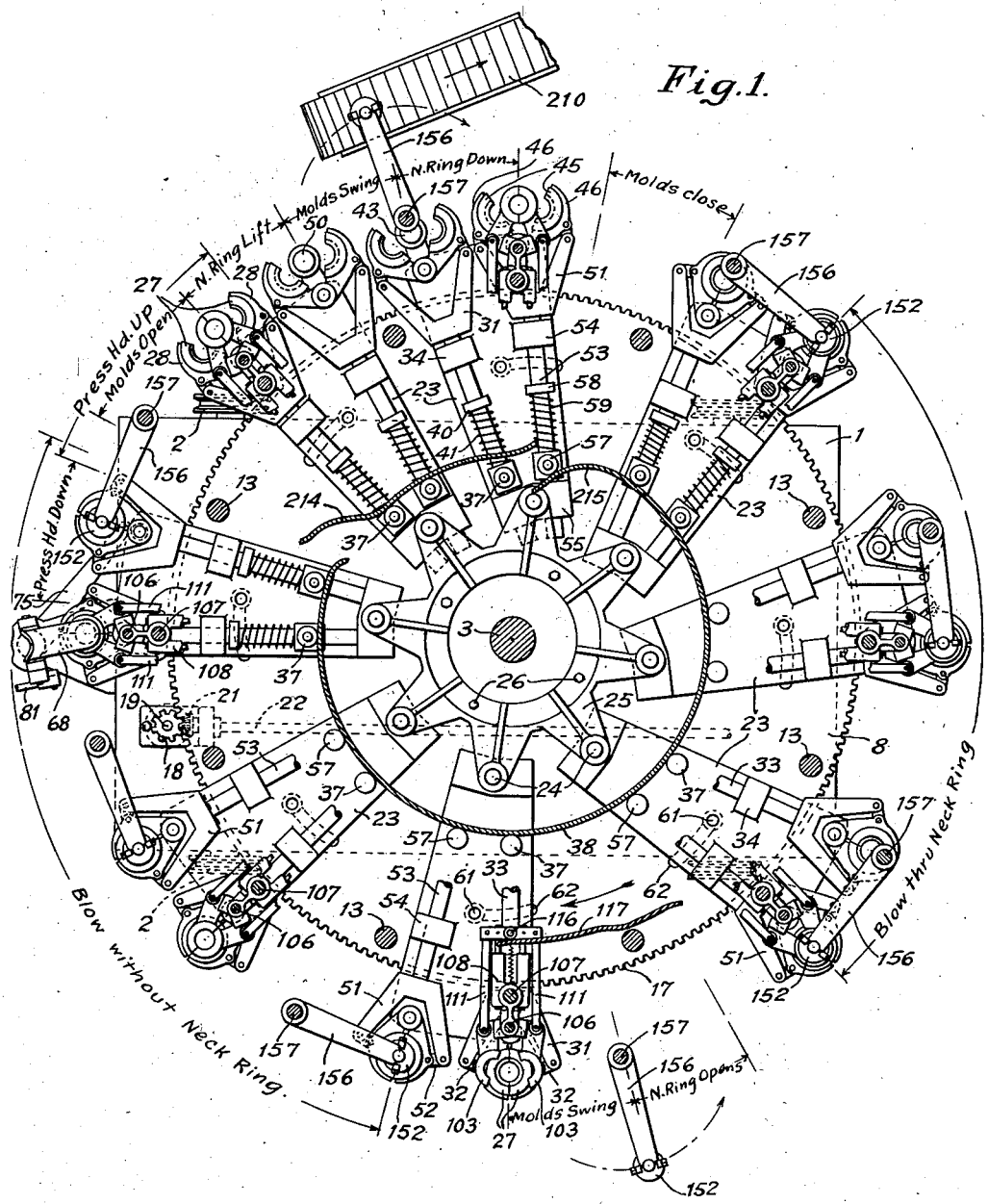
Figure 1 is a view partly in plan and partly in horizontal section with certain structure omitted to show the cycle of the machine as well as certain of the structural features thereof.

Fig. 11 is an end elevation of the combined blow head and take-out as seen from the left of Figs. 8 and 9; and Figs. 12 to 18 inclusive are diagrammatic views illustrating the various steps in the process of making an article, Fig. 12 showing the supplying of a charge of glass to the blank mold; Fig. 13, the pressing thereof to form a blank; Fig. 14, the stripping of the blank mold preparatory to the transfer; Fig. 15, the blank within the open blow mold after the transfer has been substantially completed; Fig. 16, the final blowing of the article through the neck ring; Fig. 17, the secondary final blowing without the neck ring; and Fig. 18, the removal of the completed article and the placing of it upon the removal conveyor.

I have chosen to illustrate as an embodiment of my invention a machine of the continuously rotating, single turret type for manufacturing articles of hollow glassware by the press and blow method, this machine embodying the several features above outlined in the several objects of the invention.

*Main construction and turret rotating means*

The machine of the accompanying drawings is shown as mounted upon a base 1, which is provided with wheels 2 so that it may be moved toward and from a desired operating position. The base 1 carries stepped therein a stationary vertical column 3 by which the rotating parts are guided and which also serves to hold certain of the fixed cams for operating various of the working instrumentalities. The base 1 carries secured thereto as at 4 an annular member 5 which carries the lower raceway 6 of ball bearings 7 by which the weight of the rotating parts of the turret is supported.

The main turret comprises a lower turret plate 8 which is provided with a bearing portion 9 surrounding column 3 to locate this plate against lateral movement, the plate 8 also carrying the upper raceway 10 resting upon the ball bearings 7. The turret also includes the upper turret plate 11 having a bearing portion 12 surrounding a portion of the column 3, the plates 8 and 11 being secured together by a plurality of rigid vertical shafts 13 suitably bolted to these two plates. Intermediate the height of the shafts 13 is an intermediate turret ring 14 secured thereto as by cap plates 15 and bolts 16.

Figure 2:
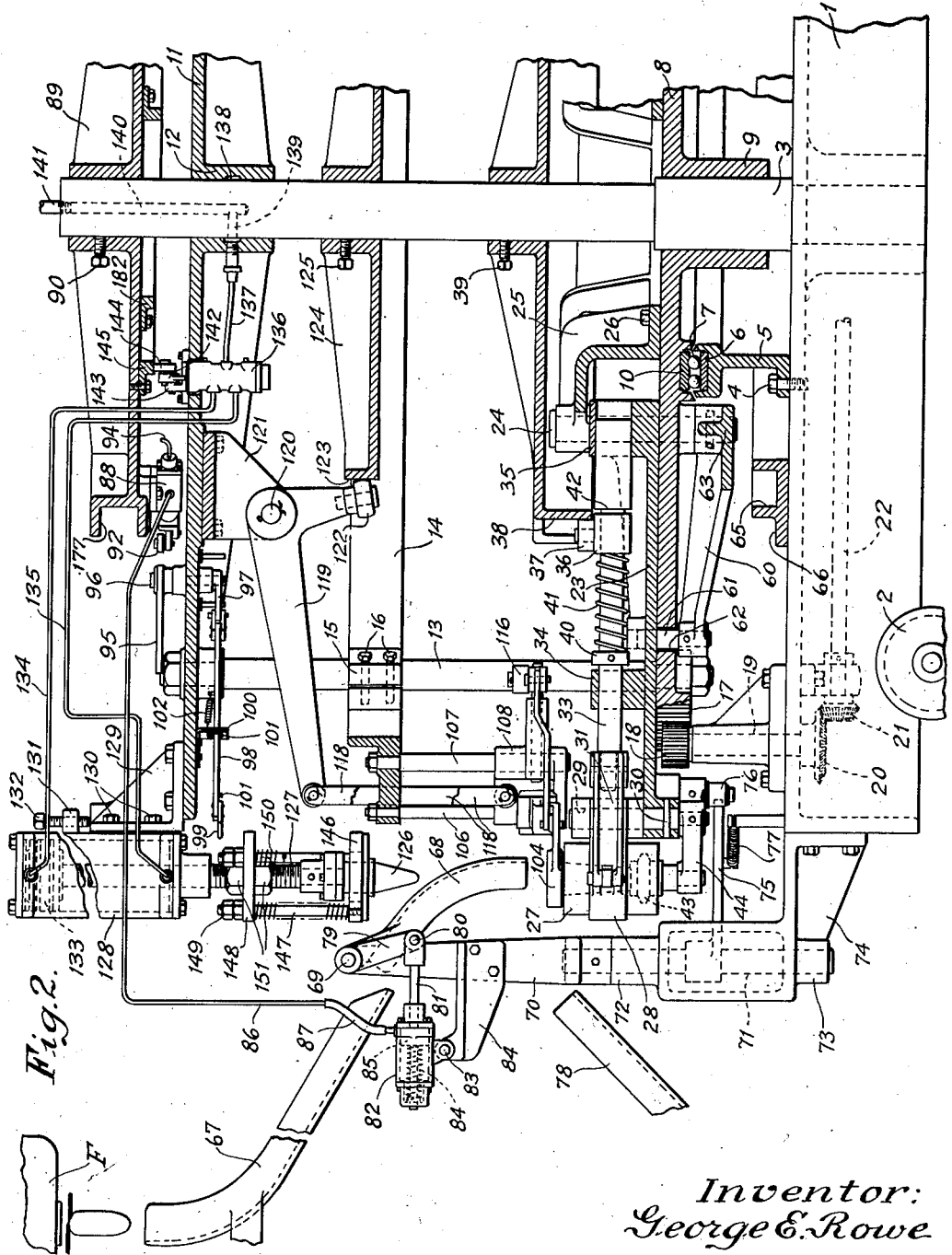
Fig. 2 is a view chiefly in vertical section from the outside of the machine, as seen in Fig. 1 at the left, through the center thereof and illustrating the manner of charging the molds and the mounting and construction of the blank forming means, certain of the air piping being illustrated diagrammatically.

The turret including the upper and lower turret plates 11 and 8 and the intermediate ring 14 is preferably rotated continuously about the center column. For this purpose the lower turret plate 8 is provided with an annular series of gear teeth 17 with which meshes a pinion 18 (Fig. 2) mounted upon a short vertical shaft 19 which carries at its lower end a beveled gear 20 meshing with a beveled pinion 21 on a horizontally extending shaft 22. The shaft 22 is adapted to be driven from any suitable source of power operated in suitable synchronized time relation with the glass feeding device generally indicated at F (Fig. 2). Means are preferably provided for throwing out the forming machine during the continuous operation of the feeder, such as a clutch (not shown), and other means are preferably provided for protecting the driving mechanism in the event that there is an overload on the machine, so as to prevent breakage of the parts, such means including a shearing pin (not shown) in suitable relation to the machine drive. These means are not illustrated in the accompanying drawings and may be assumed to be conventional.

*Mold, mounting and operating means*

The machine as illustrated in the accompanying drawings is provided with eight mold forming units, each unit including a blank mold and a blow mold and suitable means for forming glass articles therein. Inasmuch as these units are all similar each to the others, a description of one will suffice.

The blank and blow mold of each unit are mounted upon a swing plate 23 which is arranged for limited pivotal movement with respect to the lower turret plate 8. Each plate 23 is mounted upon a vertical axis pivot 24 which is journaled in the lower turret plate 8 and also in a bearing in a spider 25 secured to the turret plate 8 as by bolts 26.

The blank molds illustrated each comprise a pair of complementary portions or halves 27 each portion or half being suitably received in a mold holder 28, as seen in Figs. 1, 2, 5, and 12 to 14. The mold holders 28 are pivoted upon a common vertical pintle 29 secured in the swing plate 23 as by the pin 30 (Fig. 2).

For opening and closing the blank mold there is provided a substantially V-shaped yoke member 31 which is connected to the two mold holders 28 by short links 32. The yoke 31 is secured to the outer end of a rod or shaft 33 which is slidingly received in a bearing 34, which may be either round or square in section, and a bearing 35, which is preferably square or non-circular in section so as to prevent rotation of the rod 33 with respect to its bearings. The bearings 34 and 35 may be formed either integral or rigid with the swing plate 23, as illustrated in Fig. 2. Arranged to slide upon a non-circular portion of the rod 33 is a collar 36 carrying a cam roller 37 which is adapted to cooperate with the fixed cam 38 secured to the main column 3, as by the set screw 39. The non-circular section of the rod 33 upon which the collar 36 slides serves to prevent the roller 37 rotating out of the desired position as illustrated in the drawings. A collar 40 is secured to the rod 33 and is separated from the sliding collar 36 by a compression spring 41. At the right of the sliding collar 36, as seen in Fig. 2 of the drawings, the rod 33 is provided with a shoulder 42 against which the sliding collar 36 may abut. Thus movement of the cam roller 37 to the left, as seen in Fig. 2, will be effective through the compression of the spring 41 and the collar 40 to cause a resilient movement of the rod 33 to the left, this resiliently closing the blank mold. Movement of the roll 37 to the right as seen in this figure will be effective to cause the engagement of the sliding collar 36 with the shoulder 42 of the shaft 33 and this will positively move the shaft 33 inwardly of the machine to cause the positive opening of the blank mold.

While I have shown and described a blank mold formed in parts or sections, it will be understood that certain types of articles may be formed by the use of a one-piece blank mold, such construction being within the purview of my invention. In the event that this type of blank mold is used, the blank mold opening and closing means may be dispensed with and the mold merely mounted rigidly, but removably, upon the swing plate 23.

The partible blank mold shown in the accompanying drawings and above described is provided with a suitable bottom plate 43 (Figs. 2 and 12 to 14). This bottom plate is carried on the upper end of a stud which is removably carried by an arm 44 which may be secured to the lower end of the pintle 29, or in any other manner to swing plate 23. No provision is made in the machine illustrated for movement of the bottom plate although such provision may be employed if desired.

The blow mold of each unit is formed in a manner similar to the blank mold of complementary portions or halves 45 removably secured in mold holders 46, as illustrated in Figs. 3, 5 and 15 to 17, the mold holders being pivoted as seen in Fig. 3, upon a pintle 47 rigidly secured in the swing plate 23 as by a pin 48. The lower end of the pintle 47 may be used as a support for the arm 49 which removably carries the bottom plate 50 for the blow mold, in a manner similar to that described above for the blank mold.

Means are provided for opening and closing the halves of the blow mold in substantially the same manner and by mechanism similar to that above described for the blank mold. This means includes a substantially V-shaped yoke member 51 connected to the two halves of the blow mold holder by short links 52 and carried by the outer end of a rod 53 mounted in bearings 54 and 55 corresponding respectively to bearings 34 and 35. The rod 53 is similarly formed with two portions non-circular in section, as above described, as best shown in Fig. 4, which illustrates the sliding collar 56 on a square portion of the shaft 53. The collar 56 carries a cam roller 57 which co-operates with the same cam 38, as in the case of the blank mold operating cam roller 37. Thus the blank and blow molds will be operated substantially simultaneously, the blow mold being first opened or closed and the blank mold operated in the same way immediately thereafter. This will be evident from a consideration of Fig. 1 of the drawings wherein the arrow indicates the direction of rotation of the turret as clockwise and in each unit the blow mold leads the blank mold in the direction of rotation of the turret. The rod 53 is similarly provided with a collar 58 secured thereto and separated from the sliding collar 56 by a compression spring 59, it being understood that there is a shoulder on the rod 53 between two portions of different section corresponding to the shoulder 42. The manner of opening and closing of the blow mold is exactly the same as that described above for the blank mold, the mold halves or portions being closed resiliently and positively opened by and in response to the rotating movement of the turret operating through the relative movement between the cam roller 57 and the cam 38.

Figure 5:
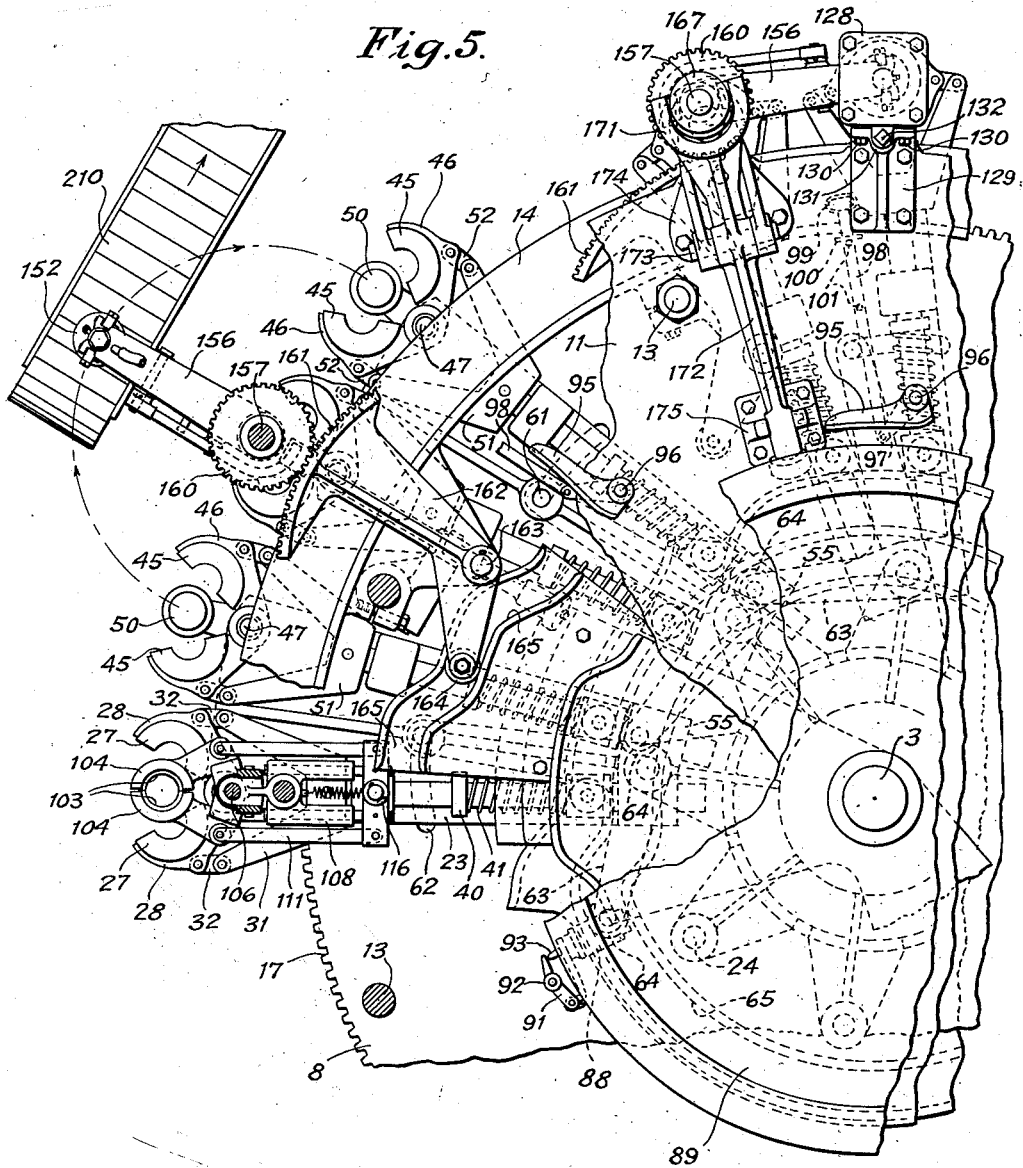
Fig. 5 is a fragmentary view in plan with parts broken away and in section to illustrate certain of the construction relating to the operating means for the neck ring and the combined blow head and take-out mechanism.

Means are provided for oscillating each swing plate 23 to bring the blank and blow molds of the associated forming unit alternately to a single predetermined position with respect to the turret. For this purpose the pintle shaft 24 about the axis of which the swing plate 23 is adapted to oscillate is provided at its lower end, as seen in Figs. 2 and 3, with a bell crank 60 secured thereto. In order to make this action positive and positively to predetermine the terminal positions of the swing, one arm of the bell crank 60 is provided with an upstanding pin 61 passing through an arcuate slot 62 in the table or turret plate 8 and received in a suitable opening in the swing plate 23. Thus movement of the bell crank 60 will be positively imparted to the swing plate 23 and the limits of this movement will be predetermined by the dimensions of the slot 62. The second arm 63 of the bell crank 60 is provided, as illustrated in Fig. 5, with a cam roller 64 which is adapted to be received in a cam track 65 (Figs. 2, 3 and 5), formed in a member 66 mounted rigidly upon the base 1 of the machine. Thus rotation of the turret as above set forth will be effective through the varying diameter of the cam track 65 to cause the swinging of the swing plate 23 to the end that the blank and blow molds of each unit will be alternately positioned in a single predetermined position respectively on the turret.

*Means for supplying glass to molds and for diverting charges to cullet*

As set forth above, the machine disclosed in the accompanying drawings is a continuously rotating machine so that the problem arises of supplying charges of glass to the blank molds during the movement thereof. For this purpose it is desired that a deflector or charge guiding means have a certain movement approximating to some extent the movement of the molds to be charged during their passage through the charging zone.

As shown in the accompanying drawings, Figs. 1 and 2, the charges of glass are supplied from the feeder F which may be of any well known type. These charges pass down a chute system indicated generally at 67, which may be made in one or more sections and which may be supported in any desired manner in a stationary position. For directing the charges into the blank molds there is provided a deflector 68 which is mounted upon horizontal pintles 69, carried by a standard 70, the upper end of the deflector 68 being substantially over the center of the standard 70. This standard is mounted for oscillatory movement about a vertical axis substantially in alignment with the upper end of the deflector 68, so as the blank molds move past the lower end of the deflector, this lower end may be oscillated about a vertical axis eccentric of the turret to cause the path of the lower end of the deflector to approximate to some extent the path of the blank molds.

As shown, the standard 70 is mounted upon the upper end of a vertical shaft 71, journaled in bearings 72 and 73 in a bracket 74, extending from the base 1 of the machine. Intermediate the bearings 72 and 73, the shaft 71 has connected thereto a collar carrying an arm 75, the outer end of which is adapted to be engaged successively by each of a series of rollers 76 mounted upon the lower ends of the blow mold hinge pintles 47, or in any other suitable way upon the swing plates 23 or the lower turret plate 8. Thus as each forming unit passes through the charging zone the roller 76 thereof will engage the inner end of the arm 75 to swing the deflector 68, causing its lower end to follow to some extent the path of the blank mold of the unit so that should there be a slight variation in the time of supply of the charges to the mold from the feeder F, these charges will be suitably guided into the mold centrally thereof. Suitable means, for example, a spring 77 extending between the arm 75 and a suitable fixed anchorage may be employed for returning the deflector to its initial terminal position after each roller 76 has passed beyond the end of the arm 75. Suitable stop means may be provided, which may take the form of an opening of predetermined size in the sleeve surrounding the shaft 71 intermediate the bearings 72 and 73 for limiting this return movement of the arm 75 under the action of the spring 77.

In some cases it may be desired for one reason or another to prevent the supplying of glass charges to one or more particular units while permitting the continued operation of the remaining units. For this purpose there are means operable in connection with the machine of my invention for deflecting glass charges to cullet for any unit which it is desired to hold out of operation without stopping the machine as a whole.

As shown, Fig. 2, a cullet chute 78 is provided in such relation to the chute system 67 and the deflector 68 so that the latter may be rotated about the axis of its pintles 69 to deflect charges supplied down the chute system 67 into the chute 78 which may direct them to any suitable collecting point. For this purpose the deflector 68 is as above described, secured to the pintles 69, one of which has also secured thereto an arm 79 pivoted at 80 to the piston rod 81 of a pneumatic cylinder 82. The pneumatic cylinder 82 is pivoted at 83 to a bracket 84 extending from the standard 70 so that the lost motion incident to the swing of the arm 79 may be accommodated by the swinging of the cylinder 82 on its pivot 83.

A compression spring 84 is provided within the cylinder 82 and extending between the rear of the piston 85 thereof and the left hand end of the cylinder, as seen in Fig. 2. This spring normally holds the deflector in its operable position in which it will be properly disposed to direct a charge of glass into one of the blank molds. When, however, it is desired to deflect a charge to cullet, pneumatic pressure may be supplied to the cylinder 82 between the right hand end thereof, as seen in Fig. 2, and the piston 85. For this purpose there is provided a pressure line 86 having a flexible section 87 communicating with the cylinder 82 to accommodate the movements of the cylinder. The pressure line 86 communicates in a manner diagrammatically shown in Fig. 2 with a valve 88 secured to a cam carrying member 89 which in turn is secured to the main standard 3, as by means of a set screw 90.

Pivotally mounted upon the outer edge of the cam carrying member 89 is a rocker member 91 (Figs. 2 and 5), which carries a cam roller 92 and which has a portion in alignment with the stem 93 of the valve 88. The valve 88 communicates with a constant source of fluid pressure supplied through a pipe diagrammatically illustrated at 94 and may be assumed to be of the poppet type and which is normally maintained closed by a suitable spring (not shown). Thus when the cam roller 92 is engaged by a cam, later to be described, the rocker 91 will be swung to the right, as seen in Fig. 5, to depress the valve stem 93 against the action of the spring within the valve to admit pressure through the pressure line 86 which will be effective to swing the deflector 68 to a position to deflect a charge of glass down the cullet chute 78.

For operating the cam roller 92 to deflect charges when desired, each unit is provided with a cam 95 (Figs. 2 and 5), this cam being mounted upon a short shaft 96 pivoted in the upper turret plate 11 for rotation about a vertical axis. Fig. 2 and the center portion of Fig. 5 show the inoperative position of this cam while the operative position thereof is illustrated at the right in Fig. 5 in which latter position it will be so located as to engage the cam roller 92 and open the valve 88 to deflect a charge of glass to cullet, as above set forth.

For holding the cam in either of its two positions, the lower end of the shaft 96 is provided with a laterally extending arm 97 connected to the push bar 98 having at its outer end a handle 99 for manual manipulation. The bar 98 passes loosely through a vertically elongated opening in a bracket 100 and is provided with a pair of spaced downwardly extending pins 101 which are adapted to engage on one side or the other of the bracket 100. A tension spring 102 is connected between a suitable fixed anchorage on the upper turret plate 11 and a stud on the push bar 98, this spring tending at all times to move the cam 95 toward its inoperative position at which it will not engage the cam roller 92. The cam may be locked in this position against movement by the pin 101 seen at the right in Fig. 2, engaging the left hand side of the bracket 100, as seen in that figure. When, however, it is desired to move the cam 95 to a position such that it will engage the cam roller 92 and cause the deflection of a charge to cullet, as above described, the handle 99 is first elevated, the push bar 98 moved inward until the left hand stud 101 is at the right of the bracket 100, as seen in Fig. 2, and the handle and push bar are then lowered so that this stud engages against the bracket portion at the bottom of the opening, thus holding the spring 102 tensed and positively locating the cam 95 in the position shown at the right in Fig. 5.

From the above it will be apparent that any selected unit of the machine may be rendered inoperative as far as forming glass is concerned and that the glass charges which normally would be supplied thereto may be deflected to cullet without the necessity of stopping the machine as a whole, or of cutting off the feeder, all this during the time that any or all other units of the machine are in full operation.

*Neck ring, mounting and operating means*

As above set forth, each of the forming units of the machine shown in the accompanying drawings is provided with a neck ring in which the neck or finish portion of the article is to be formed and which is used for transferring the blanks formed in the blank mold to the blow mold. For this purpose the neck ring is provided for opening and closing movement and is also provided for vertical movement used in effecting the transfer. There is no relative lateral movement between the turret and the neck ring, the transfer being accomplished by raising the blank from the position it occupied in the blank mold, then bringing the blow mold to this position and lowering the neck ring to lower the article to a position such that the blow mold may close therearound, this interchange of the positions of the blank and blow mold being accomplished by the movement of the swing plate 23, as above set forth.

Each neck ring is preferably formed of two complementary halves or portions 103, as illustrated in Figs. 1, 6 and 7. These portions or halves are mounted in suitable holders 104 which are pivotally mounted, as at 105, upon a vertical rod 106, one of the neck ring holders having two portions journaled on this rod and the other having one portion journaled thereon intermediate the two portions of the other holder, as illustrated in Fig. 7. The rod 106 and another rod 107 parallel thereto are secured in the intermediate turret ring 14, as best seen in Fig. 2. Slidingly mounted on the rods 106 and 107 is a neck ring carrier 108, this carrier having portions sleeved on rod 106 above and below the pivotal portions for the neck ring holders 104, as illustrated at 109 and 110 respectively. The neck ring holders 104 are respectively connected by links 111 with a cross head 112 adapted for substantially radial movement with respect to the machine and guided in this movement by the provision of slide rods 113 rigidly secured thereto and adapted to slide in suitable bores in the neck ring carrier 108. A tension spring 114 is connected between the cross head 112 and a suitable anchorage 115 on the neck ring carrier 108, this spring tending at all times to urge the neck ring portions 103 to their closed position.

For opening the neck rings, the cross head 112 is provided with a cam roller 116 adapted to cooperate with a cam 117, as illustrated in Figs. 1 and 7, this cam being effective to move the cross head radially inwardly against the tension of the spring 114 to open the neck ring by force transmitted through the links 111. Thus the neck rings, as well as the blank and blow molds, are resiliently urged to closed position and are provided with positive opening means subject to the rotation of the turret.

The neck rings are guided in their vertical movement by the sliding of their carrier 108 upon the vertical rods 106 and 107. Means are provided for moving each neck ring carrier and its associated neck ring vertically when such action is desired. For this purpose the neck ring carrier 108 is connected by a pair of links 118 with the outer end of one arm of a bell crank 119 which is pivoted at 120 to a bracket 121 secured to and depending from the upper turret plate 11, as illustrated in Fig. 2. The other arm of the bell crank 119 depends below the pivot 120 thereof and carries a cam roller 122 which cooperates with a cam surface 123 formed on the outer periphery of a member 124 secured to the center column 3 of the machine, as by the set screw 125. Thus the neck ring will be positively raised by the roller 122 engaging a large radius portion of the cam surface 123 and will be lowered by gravity when the roller 122 comes opposite a smaller radius portion of this cam surface.

*Pressing plunger, mounting and operating means therefor*

Associated with each of the forming units and mounted to travel with the turret, there is means for forming blanks in each of the blank molds and neck rings. In the present instance, this means comprises a pressing plunger arranged above and in vertical alignment with the neck ring of each unit.

As shown, Figs. 2, 5 and 13, the pressing plunger is indicated at 126, this plunger being removably mounted upon the lower end of a piston rod 127 so as to permit of the interchange of plungers when forming articles of different type or shape. The piston rod 127 extends through the lower end of a pneumatic cylinder 128 which is rigidly, but adjustably, mounted upon the upper turret plate 11.

For mounting the cylinder 128 upon the upper turret plate 11 with provision for adjustment, there is provided a bracket 129 secured as by the bolts illustrated to the upper turret plate 11, this bracket being secured by bolts 130 passing through vertically elongated slots therein to the pneumatic cylinder 128 so as to clamp the cylinder to the bracket 129 in any desired vertically adjusted position. The cylinder 128 has formed thereon an extension 131 through which is threaded a jack screw 132, the lower end of which bears against a portion of the bracket 129. Thus when it is desired to adjust the cylinder 128 and the plunger 126 carried thereby vertically, all that is necessary is to loosen bolts 130, thread the jack screw 132 up or down, as may be necessary to secure the desired adjustment, and then tighten the bolts 130 to secure the cylinder in the new adjusted position.

Within the cylinder 128 is a piston 133 of the usual type which is caused to move up or down to raise or lower the plunger 126 by the admission of fluid pressure between this piston and the opposite ends of the cylinder respectively. This fluid pressure is admitted to the upper and lower ends of the cylinder through pressure lines 134 and 135 respectively which are diagrammatically shown in Fig. 2, although it will be understood that the course of these pressure lines is not exactly as shown in view of their cutting through a stationary part of the machine while the cylinder 128 rotates with the turret. The pressure lines 134 and 135 lead to a two-way valve 136 suitably secured to the upper turret plate 11. Pressure is continuously supplied to the valve 136 through the line 137 leading from an annular recess 138 in the bearing portion 12 of the upper turret plate 11. Pressure is supplied to this annular recess through the lateral bore 139 and longitudinal bore 140 in the column 3 from a constant pressure supply line 141 which leads from any suitable source of supply of fluid pressure.

For operating the valve 136 as desired, there is provided a rocker member 142 pivoted to a bracket 143 secured to the upper turret plate 11 and carrying the cam roller 144 cooperating with the fixed cam 145, this construction being substantially similar to the mechanism shown in Fig. 5 at 91 and 92 for operating the valve 88 to control the deflector 68 in deflecting charges to cullet. The valve 136 is preferably of the piston type adapted alternately to admit pressure to the opposite ends of the cylinder 128 and to exhaust pressure from the end opposite to that at which pressure is being admitted. The piston of the valve is preferably pushed down by the rocket 142 and moved upwardly when such action is permitted by the configuration of the cam 145 by a suitable compression spring (not shown).

Surrounding the pressing plunger 126 is a suitable follower generally indicated at 146 and constructed in the usual manner, the follower 146 being provided with a plurality of vertically extending rods 147 rigid therewith, which pass upwardly through a fixed but adjustable spring plate 148, the rods 147 having at their upper ends lock nuts 149 or other suitable stops to prevent excessive downward movement thereof and of the follower 147. Intermediate the spring plate 148 and the follower 146 and surrounding the rods 147 are suitable compression springs 150, as in the usual practice. The spring plate 148 may be vertically adjusted on the plunger stem or piston rod 127 by threading upwardly or downwardly the nuts 151 which confine it to a predetermined position on this piston rod. The operation of the follower and of the plunger is entirely conventional and hence further detailed description thereof is thought unnecessary. It may be said, however, that the follower 146 may be, and preferably is, formed in two parts and includes a plate 146a (Fig. 13) to which the rods 147 are secured and a removable glass contacting follower portion 146b interchangeable to provide for the formation of articles having different configurations of neck finish.

*Combined blow head and takeout tongs mechanism, mounting and operation thereof*

I have provided in connection with my machine as illustrated in the accompanying drawings, a plurality of blow heads equal in number to the number of forming units, that is in the machine as shown there are eight such blow heads. Associated with each of these blow heads as illustrated is a takeout tongs mechanism and means for suitably operating the tongs so that the same structure serves both to blow articles to final form and to move such articles from the final blow mold in which they are formed to a suitable delivery station. Each of the blow heads as will hereinafter appear, cooperates successively with two adjacent blow molds, so that each blow mold is engaged successively by two adjacent blow heads during each complete rotation of the turret and each article is supplied with blowing pressure successively through two adjacent blow heads. The operations and functions of these blow heads will appear more fully in the description of the operation of the machine hereinafter to be presented.

Each blow head is similar to the others so that a description of one will suffice. The blow heads are each provided with means for moving them between positions to cooperate with two adjacent blow molds and are also provided with means for moving them vertically toward and away from the blow molds, and also for moving them vertically in placing the bottles at the delivery station.

Each blow head comprises a cup shaped member 152 (Figs. 1, 3, 5, 8 to 11 inclusive; and 16 to 18). As shown in the accompanying drawings, particularly Figs. 9 and 16 to 18, the cup shape members 152 are interchangeable and are each detachably secured to the lower end of a rod 153 which may be provided with a bolt head 154 for rotating it to secure the blow head against the lower end of a sleeve 155, which in turn may be integral with or secured to the outer end of an arm 156 extending laterally from the lower end of a vertical shaft 157. If desired, means may be provided for securing the blow head member 152 to the arm 156, in a manner such that a certain amount of free movement of the head 152 is provided to permit it to seat itself upon the neck ring or molds should these parts be somewhat uneven. Such means are, however, old in the art and hence form no part of the present invention, so that it was thought unnecessary to illustrate them in the accompanying drawings, the rigid connection shown being adequate to illustrate the present invention. The shaft 157 is journaled as illustrated in Fig. 3 in upper and lower bearing members 158 and 159 secured to the upper turret plate 11 and the intermediate turret ring 14 respectively.

Means are provided for rotating the shaft 157 to move the associated blow head 152 to a position to cooperate with the blow mold in the rear thereof and in another position to cooperate with the blow mold in advance thereof, or vice versa, this means being also utilized in effecting the takeout of completed articles. For this purpose, the shaft 157 is provided intermediate its bearings with a gear 160 secured thereto and meshing with a vertically elongated gear segment 161 formed on the outer end of one arm of a bell crank 162 which is pivoted at 163 to a suitable bracket extending from the intermediate turret ring 14. The other arm of the bell crank 162 is provided with a cam roller 164, as best illustrated in Figs. 3 and 5, this cam roller cooperating with a suitably shaped cam track 165 formed in a bracket 166 extending from the stationary cam carrying member 124 which is secured as above explained to the center column 3 of the machine. Thus as the turret rotates, the blow head carrying shaft 157 will be rotated to position the associated blow head 152 as desired to cooperate with two adjacent molds and also will move it in the path substantially illustrated in Fig. 5 by the dot and dash line for the takeout operation.

Means are also provided for moving the blow head vertically when desired. For this purpose the shaft 157 is provided with a pair of spaced collars 167 and 168 secured thereto adjacent to its upper end, as by the pins shown in the drawings. Between these collars and mounted on the shaft 157 is a sliding collar 169 which is separated from the lower collar 168 by a compression spring 170. The collar 169 is formed with an annular groove into which extend a pair of inwardly directed pins from a yoke portion 171 of an arm 172. The arm 172 is pivoted at 173 to the bracket 174 which is secured to the upper turret plate 11 and which also carries the bearing 158. The arm 172 is further guided between a pair of upstanding parallel guide members of a bracket 175 secured to the upper turret plate 11, as seen in Figs. 3 and 5. At its inner end, the arm 172 is provided with a cam roller 176 adapted to ride in a cam track 177 formed in the outer periphery of the cam carrying member 89, which is secured to the upper end of the center column 3 of the machine as above set forth. Thus the blow head 152 will be resiliently lowered upon the cam roller 176 riding into a high portion of the cam track 177 through the compression of the spring 170 and will be positively raised by the engagement of the upper surface of the sliding collar 169 with the fixed collar 167 on the shaft 157, upon the cam roller 176 riding into a low portion of the cam track 177. The gear segment 161 is vertically elongated so that it will mesh with the gear 160 in all the vertical positions of the shaft 157.

Pressure is supplied to each of the blow heads from the annular recess 138 in the bearing portion 12 of the upper turret ring 11 through pipes 178 which lead to pressure controlling valves 179, one for each of the blow heads 152. These valves are operated by rocker mechanisms 180 carrying cam rollers 181 cooperating with an annular cam 182 secured to the under surface of the cam carrying member 89, the rocker members being similar in construction and operation to that illustrated in Fig. 5 at 91 and 92 for operating the valve 88 which controls the cullet deflector for each unit. The valve 179 may be considered to be of the poppet type and adapted to be depressed by the roller 181 riding under an extended portion of the cam 182 and returned by a suitable compression spring (not shown). From the valve 179 a pressure supply pipe 183 leads to a blow head 152, there being a flexible section 184 therein permitting the movement of the blow head as aforesaid. The pipe section 184 communicates with drilled passages 185 (Fig. 9) in the sleeve portion 155 of the arm 156. These passages conduct the pressure to an annular groove 186 formed in the bolt 153 which communicates through a lateral bore and thence through a longitudinal bore 187 with the interior of the cup 152, as will be seen from a consideration of Figs. 9 and 16 to 18. Thus pressure will be supplied to the interior of the blow head whenever the valve 179 is opened by the valve operating mechanism above described and in response to the rotation of the turret.

Associated with each of the blow heads 152 is a takeout tongs mechanism. This mechanism comprises a pair of tongs fingers 188 which are detachably secured to tongs carrying members 189 so as to permit of the interchange of fingers for accommodating articles of different shapes. The tongs carrying members 189 are pivoted on spaced horizontal shafts 190 journaled in the lower end of the sleeve 155 of the arm 156. The shafts 190 are preferably rigidly secured to the members 189 and carry at their inner ends, as seen best in Fig. 10, interengaging members 191 and 192 respectively, the member 191 by having a bifurcated end receiving the ball shaped end of the member 192. Thus motion imparted to one of the tongs carrying members will be similarly imparted to the other. For urging the tongs 188 constantly toward closed position, one of the shafts 190 is provided, as seen in Fig. 11, with an inwardly extending arm 193 to the inner end of which is connected the lower end of a tension spring 194 secured at its upper end to a fixed anchorage 195 shown as a pin extending from the sleeve portion 155 of the arm 156. Thus the tension of the spring 194 will constantly tend to close the tongs 188.

For opening the tongs when desired there is provided a lever 196 carrying an adjustable stud 197 (Figs. 9 and 10), which is adapted to bear against the member 191. The lever 196 is secured to a transverse shaft 198 pivoted in the lateral sides of the arm 156 and carrying at one side thereof a lever 199. Means are provided for moving the lever 199 to open the tongs and thereafter for locking this lever and the tongs controlled thereby in open position. As shown, the right hand upper portion of the upper end of lever 199, as seen in Fig. 9, is provided with an incline 200 and a flat face 201, both of which cooperate with the left hand end as seen in this figure of the lever 202 which is pivoted at 203 to the arm 156. The right hand end of the lever 202 is provided with a portion partly encircling the hub portion of the arm 156 and is adapted to cooperate with the bifurcated left hand end 204 of a lever 205, pivoted at 206 to a bracket carried by one of the vertical shafts 13 which tie together the various plates of the turret. The right hand end of the lever 205, as seen in Fig. 3, is provided with a cam roller 207 adapted to ride in a cam track 208 formed in a member 209 secured to the member 166, which in turn is secured to the cam carrying member 124 rigid with the center column 3 of the machine.

During the blowing of an article to final form it is desired that the tongs be locked in open position as shown in Figs. 9 and 11. For this purpose the cam track 208 is so formed as to retain the parts in the position shown in Figs. 3, 9 and 11, in which the left hand end of the lever 202 is engaged against the flat face 201 of the lever 199. When it is desired to allow the tongs to close, the cam roller 207 rides into a low portion of the cam track 208, which causes the engagement of the lower portion of the bifurcated end 204 of lever 205 with a part of the right hand end of lever 202, thus moving this lever counterclockwise about its pivot 203 so that its left hand end, as seen in Fig. 9, moves below the flat face 201 and down the incline 200 of the lever 199, thus permitting the clockwise rotation of the shaft 198 and levers 196 and 199 carried thereby and permitting the closing of the tongs 188 under the action of tension spring 194. When it is desired to open the tongs, the cam roller 207 rides into a high portion of the cam track 208 thus moving the lever 205 counterclockwise about its pivot 206, as seen in Fig. 3, which causes the engagement of the upper portion of the bifurcated end 204 thereof with the right hand end of the lever 202. This causes the clockwise rotation of the lever 202 about its pivot 203 which causes its left hand end to ride up the incline 200 of the lever 199 causing the counterclockwise movement of this lever about the axis of the pivot 198 and causing the opening of the tongs. As soon as the left hand end of the lever 202 has ridden onto the flat face 201 of the lever 199 and has engaged behind the stop portion of this lever, the tongs will be locked in open position, which position of the parts will continue for the major portion of the rotation of the machine even after the roller 207 has ridden out of the cam track 208.

I have shown as a delivery station for the completed articles, a portion of an endless conveyor 210 which is adapted to be continuously moved in the direction of the arrow shown in Fig. 1. This conveyor 210 may be of any conventional type and supported in any desired manner, as by a support generally indicated at 211 (Fig. 3).

It is desired that the placing of articles on the conveyor be accompanied by as little relative movement as possible between the movement of the tongs in which the articles are carried and that of the conveyor. In order therefore to cause the movement of the tongs to approximate that of the conveyor, both as to direction and speed, the cam track 165 may be so formed as to give a desired movement to the arm 156 about the axis of its shaft 157, either forward or backward with respect to the direction of rotation of the turret to the end that the tongs will move at the desired speed and approximately in the desired direction, this movement being a resultant of the movement of the tongs due to the rotation of the turret and their movement due to the rotation thereof about the axis of the shaft 157.

Operation of the machine

The operation of the machine may best be described considering Fig. 1 which is provided with legends setting forth one possible series of operations taking place around the cycle, the several operations being further illustrated in Figs. 12 to 18.

As a mold unit reaches substantially the horizontal position, as seen in Fig. 1, between the center and left hand side of the machine, which is the charging position, the forming unit is advanced with respect to the turret, that is the swing plate 23 of a unit to be charged is positioned as far clockwise of its pivot 24 as is possible. In this position the blank mold of the pair is at the common forming point for the unit and is in position to receive a mold charge which is supplied thereto from the feeder F through the chute system 67 and deflector 68 as above set forth, it being assumed that the deflector is in position to direct a charge into the mold rather than to direct the charge to cullet. At this time the neck ring 103 is closed and in a cooperative relation with the blank mold so that the charge of glass is supplied therethrough. In Fig. 12 the parts are illustrated in the position in which they receive the charge, the charge itself being indicated at 212.

Almost immediately after the blank mold has passed beyond the lower end of the deflector 68, the pressing plunger 126 is moved downwardly by the admission of fluid pressure to the cylinder 128 through the pressure line 134, pressure being exhausted through the line 135, this being accomplished by the suitable positioning of the plunger of valve 136. This operation is indicated in Fig. 1 by the legend "Press Hd. down". The press head may be retained in its lowered position for any desired predetermined time, the parts in this position being illustrated in Fig. 13 and the glass now being pressed to form the blank as indicated at 213.

After the plunger has been in its lowered position for a sufficient time for the extraction of the desired amount of heat from the blank to the plunger and mold walls so that the blank may be considered as "set up", the plunger 126 is raised by the admission of pressure to the cylinder 128 through the line 135 and the exhaustion thereof through the line 134, this being accomplished by a shifting of the valve 136 in response to a difference in the height of the portion of the cam 145 opposite the cam roller 144. The press head is thus raised out of contact with the glass. This operation is denoted on the drawing, Fig. 1, by the legend "Press Hd. up".

At any time after the press head or plunger 126 has been stripped out of contact with the glass, the blank mold may be opened, and considering now only the mold in which the blank is being formed, the blank mold 27 in which this blank 213 was formed is now opened by the associated cam roller 37 riding behind the portion 214 (Fig. 1) of the cam 38. This operation is indicated in Fig. 1 by the legend "Molds open" and is illustrated in Fig. 14, the blank 213 now being supported on the bottom plate 43 and gripped by the neck ring 103.

The next operation in the cycle is the transferring of the blank from the blank mold to the blow mold. For this purpose the neck ring is lifted due to the roller 122 riding on to a high (larger radius) portion of the cam surface 123, which raises the blank 213 completely above the level of the blank and blow molds of the forming unit being considered. The next operation in effecting the transfer is the swinging of the swing plate 23 of this unit from its advanced position to its retarded position with respect to the turret, which is accomplished, as above set forth, by the cam roller 64 riding into a small radius portion of the cam track 65. This positions the blow mold of the unit being considered beneath the neck ring. These two operations are indicated in Fig. 1 by the legends "N. ring lift" and "Molds swing" respectively. The neck ring is then lowered carrying the blank 213 therein to the position of the parts shown in Fig. 15, this operation being accomplished by the roller 122 riding onto a small radius portion of the cam surface 123 and being denoted on Fig. 1 of the drawings by the legend "N. ring down". The molds are then closed so that the blow mold now surrounds and supports the blank held in the neck ring, this operation being accomplished by the blow mold operating cam roller 57 riding up the portion 215 of the cam 38 and being denoted on Fig. 1 of the drawings by the legend "Molds close".

The blow head 152 has by this time been swung around to the position to cooperate with the blow mold in advance of its pivotal shaft 157 and is lowered by the configuration of the cam track 177 so that it engages over the top of the neck ring as shown in Fig. 16, the tongs 188 being meanwhile locked in open position as indicated in Figs. 16 and 9. Blowing pressure is then admitted through the blow head and the neck ring to expand the glass to the shape of the blow mold as indicated in Fig. 16 and on Fig. 1 of the drawings by the legend "Blow thru neck ring".

The provision as herein made of applying final blowing pressure to the interior of an article in the final blow mold, first through the neck ring and thereafter after the removal of this neck ring has peculiar and novel advantages not present in any known single turret machine. In the first place it is, of course, desirable that provision be made for blowing after the removal of the neck ring as this is necessary in order that the "overlapping cycle" may be practiced in the use of the machine, as of course it would be impossible simultaneously to blow one article to final form through a single neck ring and at the same time use this same neck ring in cooperative relation with the associated blank mold for the forming of a charge of glass into a parison. On the other hand, there are many types of articles, such for example as those having screw threaded tops or finishes which have no other projection in the finish to be made except the screw threads, which would be extremely difficult, if not impossible, to make unless provision were made for blowing in the final blow mold through the neck ring for a sufficient time at least to expand the glass to the shape of the final blow mold and thus anchor it securely therein. The dropping of the parison into the final blow mold would require some support of the finish of the parison by that mold, and if in the case of articles of this type this support were not supplied to an adequate extent by the finish provided, or if the only finish available for this support were the inclined screw thread projections, the support of the parison by the final blow mold prior to the expansion thereof in this mold would be insecure and inaccurate and tend to cause deformation of the parison prior to its expansion and consequent definite location within the final blow mold. Such a finish can be properly formed in the neck ring during the parison formation and if this finish is held securely in the same or some similar neck ring until the body portion of the glass is expanded to the shape of the final blow mold, the neck ring may then be safely removed without the possibility of swaying and consequent deformation of the article within this mold. Thus properly formed articles are assured by the construction and manner of operation herein disclosed.

The next operation in the cycle is the raising of the blow head which has effected the blowing thus far (after the admission of pressure thereto has been cut off) and the starting of the swing thereof from the mold unit in advance thereof toward the mold unit in the rear thereof considering the cycle from the point of view of the direction of rotation of the turret as indicated by the arrow (Fig. 1). As soon as this operation has progressed sufficiently so that the blow head is clear of the neck ring, this member is opened by the action of the cam 117 and then raised sufficiently to clear the top of the article in the mold. The swing plate 23 carrying the molds of the unit in question is then swung forwardly of the direction of rotation of the turret to its advanced position with respect thereto at which charging takes place, this action being accomplished by the action of the cam track 65 and the cam roller 64 associated therewith, the operation being indicated on Fig. 1 by the legend "Molds swing". The neck ring is thus again in alignment with the blank mold and at any time between this point and the charging point or zone the neck ring is lowered into engagement with the blank mold of the unit for the reception of the next charge of glass as above set forth.

Meanwhile the several adjacent blow heads 152 continue their movement about the axis of their shafts 157, so that the blow head in advance of the unit in question is now positioned above the blow mold in which the article being considered is being formed. This blow head is now lowered through the action of its cam roller 176 and the cam track 177 to cooperate with the blow mold in which the article is being formed. It will be noted, however, that the blow head now being employed is not the same as that previously used in blowing the article, but this blow head is now lowered to engage the top of the blow mold as shown in Fig. 17 and surrounding the neck portion of the article. Further blowing pressure is now admitted through this blow head for a period of time extending beyond the time that the blank mold being considered has passed through the charging zone, has received a second charge of glass, and this second charge of glass has been pressed to form a second blank as above set forth. Thus the machine includes an "overlapping cycle" as set forth in the introduction to this specification. This operation is denoted on the drawing, Fig. 1 by the legend "Blow without neck ring".

The next and final operation on the bottle being considered is the takeout thereof. This is accomplished first by the opening of the molds as aforesaid, the blow mold being open substantially simultaneously with the blank mold. The locking mechanism for the tongs is then tripped so as to permit the tongs to close to engage the neck or finish portion of the article. The blow head and tongs carried thereby are then swung about the axis of their shaft 157 from a position in rear of this shaft to a position in advance thereof substantially through the path indicated by the dot and dash lines in Fig. 5, so that this blow head may again cooperate with the blow mold in advance thereof. However, intermediate this swing is the delivery of the completed article onto the conveyor 210. The article is gripped by the tongs of the blow head by which it is last blown, due to the closing of the tongs under the action of the spring 194. The blow mold being open the article is swung out over the conveyor 210, as illustrated in Figs. 1 and 18. The tongs are then lowered due to the configuration of the cam track 177 to lower the completed article onto the conveyor 210 and the cam track 165 is so formed that the speed and direction of movement of the tongs approximates that of the conveyor 210, so that there will be little or no danger of tipping the article over when it is placed thereon. At the proper time the tongs are opened, through the means above described, including the cam track 208 and cam roller 207 (Fig. 3). The tongs and blow head are then raised so as to clear the article deposited on the conveyor as illustrated in Fig. 3 and the rotation of the shaft 157 carrying this blow head is then continued to position the blow head for the blowing of the next succeeding article through the neck ring.

It is to be understood that all of the mechanisms disclosed in the accompanying drawings are for purposes of illustration only as is also the particular cycle shown and described herein. Further, it is contemplated that any or all of the cams may be made adjustable as around the center axis of the turret for varying the cycle to a certain extent or may be made interchangeable if desired for this same purpose, particularly for making articles of somewhat different types. Also, while I have described a continuously rotating machine, it will be understood that the instrumentalities herein disclosed are to a major extent applicable also to an intermittent machine, for example, one in which certain relatively short stop times are provided at intervals in the rotation thereof and in which it is desired to effect certain of the operations during the rotation of the machine. Other variations may be made of the machine of my invention and of the methods of use thereof within the scope of the appended claims, which are to be construed as broadly as the state of the prior art permits.

I claim:

1. Apparatus for forming hollow glass articles comprising a rotatable turret, at least two blow molds carried thereby and positioned in spaced relation about said turret in which different glass articles are formed during overlapping periods of time, a single blow head carried by and rotating with said turret and constructed and arranged successively to cooperate with two adjacent blow molds thereon, and means for admitting blowing pressure through said blow head to be successively applied to the interior of glass articles within each of said adjacent blow molds.

2. Apparatus for forming hollow glassware, comprising a rotatable turret, a plurality of blow molds disposed about said turret, a plurality of blow heads the same in number as the blow molds and disposed about and carried by said turret for cooperation with said blow molds, operating means for said blow heads to cause each blow head to cooperate successively with two adjacent blow molds, whereby each blow mold is successively in cooperative relation with two adjacent blow heads, and means for supplying blowing pressure through each of said blow heads, the several means being so constructed and arranged that each article being formed in each of said blow molds is subjected successively to two applications of blowing pressure through two different blow heads respectively.

3. Apparatus for forming hollow glassware, comprising a continuously rotating turret, a plurality of forming units mounted on said turret for limited movement with respect thereto in advancing and retarding with relation to said turret, each of said forming units including a blow mold and a blank mold, a plurality of neck rings carried by said turret and adapted each to cooperate with one of said forming units and to effect a transfer of blanks formed in the blank mold thereof to the blow mold of the same unit, means for forming blanks in said blank molds and neck rings, means for operating all said molds and said neck rings to the end that the blanks thus formed are transferred from said blank molds to said blow molds, a plurality of blow heads similar in number to the number of forming units, each of said blow heads cooperating alternately with the blow mold of one of said units to supply blowing pressure through the neck ring associated with that unit to expand the glass in such blow mold and with the blow mold of another of said units to blow the glass therein without the interposition of the associated neck ring by directly engaging the blow mold of such other unit, and means for controlling the supplying of blowing pressure to and through each of said blow heads.

4. Apparatus for forming hollow glass articles, comprising a rotatable turret, means for rotating said turret about a vertical axis, at least two blow molds mounted on said turret, a combined blow head and takeout tongs mechanism mounted on said turret for cooperation alternately with two adjacent blow molds, an arm carrying said combined blow head and takeout tongs mechanism mounted to swing on a vertical axis moving with but eccentric of the axis of rotation of said turret, means to operate said blow head to cause it to cooperate with and admit blowing pressure to glass in each of said blow molds alternately, and means for causing said head and takeout tongs to swing in a substantially horizontal arcuate path about the axis of said arm and with respect to said turret for moving the head from a position in cooperation with one of said blow molds to a position in cooperation with the other of said blow molds and during this movement for operating the takeout tongs mechanism associated with said head for removing a completed article from the first named blow mold and transferring it to a delivery station outwardly of said turret.

5. Apparatus for forming hollow glass articles, comprising a rotatable turret, means for rotating said turret about a vertical axis, at least two blow molds disposed about said turret, an arm mounted for swinging movement about a vertical axis rotating with said turret but eccentric of the axis of rotation thereof, a combined blow head and takeout tongs mechanism mounted on said arm, means for moving said arm about its vertical axis and with respect to said turret to bring said blow head alternately into cooperative relation with two adjacent blow molds at the ends of its swinging movement, means for moving said arm and the blow head and tongs mechanism carried thereby vertically, means for supplying blowing pressure through said head to the interiors of glass articles in each of said adjacent blow molds, means for actuating said tongs mechanism to grasp a completed glass article in one of said blow molds for the removal thereof upon the opening of this blow mold, and means for causing said tongs mechanism to open to release a glass article gripped thereby at a delivery station intermediate the ends of the swing of said arm between a position to locate said blow head in cooperative relation with the blow mold in which the article was formed and the other of said adjacent blow molds.

6. Apparatus for forming hollow glass articles, comprising a rotatable turret, means for rotating said turret continuously about a vertical axis, at least two blow molds mounted for rotation with said turret, a combined blow head and takeout tongs mechanism adapted to cooperate alternately with two adjacent blow molds and to supply blowing pressure to the glass in each of said adjacent blow molds, means for causing said blow head to cooperate with each of said adjacent blow molds alternately including means for swinging said blow head about a substantially vertical axis rotating with the turret but eccentric of the axis of rotation thereof, means for admitting blowing pressure through said blow head into the glass in each of said adjacent blow molds for predetermined periods of time, means for causing the takeout tongs mechanism carried by said blow head to grip a completed article in one of said blow molds and thereafter and intermediate the swing of said head between said adjacent blow molds to release the completed article at a delivery station, and cam means operating in response to the continuous rotation of said turret for determining the direction and angular velocity of the swinging movement of said tongs mechanism intermediate the ends of the swing of said blow head so that the resultant direction and velocity of movement of the takeout tongs carrying the completed article may be predetermined as desired.

7. Apparatus for forming hollow glass articles, comprising a continuously rotated turret, means for rotating said turret continuously about a vertical axis, a plurality of glass forming units mounted on said turret, each unit including a blank mold, a blow mold and a single neck ring, the neck ring of each unit being mounted on said turret for solely vertical and opening and closing movement in respect thereto, a swing plate mounted on said turret for limited swinging movement with respect thereto about a vertical axis eccentric of the axis of rotation of said turret and carrying the blank and blow molds of each unit, means for opening and closing said neck ring, means for opening and closing each of said blank and blow molds, means for raising and lowering said neck ring, the aforesaid parts being so constructed and arranged that blanks formed in the blank mold may be transferred to the blow mold by opening the blank mold, vertically raising the neck ring, swinging the swing plate of the unit to bring the blow mold thereof beneath said neck ring, lowering the neck ring to position the blank within the open halves of the blow mold and closing the blow mold about the blank as so positioned, means including a pressing plunger for each unit mounted on said turret for forming blanks in the blank mold and neck ring of the associated unit, the mold and neck ring operating means being thereafter actuated to effect the transfer of the blank from the blank mold to the blow mold of each unit as aforesaid, a plurality of combined blow heads and takeout tongs mechanism equal in number to the number of forming units and each arranged to cooperate with blow molds of two adjacent units, the parts being so constructed and arranged that each blow head cooperates with a unit in advance thereof while such unit is in a retarded position with respect to said turret to expand a blank in the blow mold of such unit by pressure admitted through the neck ring of such unit and thereafter to cooperate with the blow mold in the rear thereof to admit further blowing pressure to the interior of the article within the blow mold of the rearward unit while it is advanced with respect to said turret, whereby the neck ring may reassume its position in cooperation with the blank mold of its associated unit during the second blowing of an article therein for the forming of a second blank while blowing pressure is still being applied to the blow mold of that unit, and means for actuating the combined blow heads and takeouts to the end that completed articles are removed from the blow molds of the several units and positioned at a desired delivery station intermediate the swing of the blow head from a cooperative position with the unit in the rear thereof to a cooperative position with the unit in advance thereof, all the several operating means being controlled by and in response to the rotation of the turret.

GEORGE E. ROWE.